US005318158A

United States Patent [19]

Seasholtz

[11] Patent Number: 5,318,158

[45] Date of Patent: Jun. 7, 1994

[54] CORD RETAINER FOR ELECTRIC POWER CORD

[75] Inventor: Craig A. Seasholtz, Avis, Pa.

[73] Assignee: McCulloch Corporation, Tucson, Ariz.

[21] Appl. No.: 984,372

[22] Filed: Dec. 2, 1992

Related U.S. Application Data

[63] Continuation-in-part of Ser. No. 865,996, Apr. 9, 1992, abandoned.

[51] Int. Cl.[5] .......... H01R 13/72; F16L 3/00

[52] U.S. Cl. .......... 191/12 R; 174/46; 439/501; 439/457; 248/52

[58] Field of Search .......... 191/12 R, 12 S, 12.2 R, 191/12.4; 439/4, 451, 452, 457, 501, 528; 248/51, 52; 414/918; 174/46, 168, 174; 310/47, 50; 24/115 F, 129 A, 908

[56] References Cited

U.S. PATENT DOCUMENTS

| | | | |
|---|---|---|---|
| D. 254,565 | 3/1980 | Brown | D23/155 |
| D. 298,673 | 11/1988 | Slany et al. | D32/18 |
| 627,215 | 6/1899 | Stewart | 248/328 |
| 670,552 | 3/1901 | Brown | 248/328 |
| 741,154 | 10/1903 | Meyer | 248/328 |
| 936,156 | 10/1909 | Parker . | |
| 941,979 | 11/1909 | Denhard . | |
| 997,054 | 7/1911 | Gagnon . | |
| 1,068,139 | 7/1913 | Johnson | 24/129 A |
| 1,259,609 | 3/1918 | Denhard . | |
| 1,580,503 | 4/1926 | Lauter . | |
| 1,643,656 | 9/1927 | Haselton | 191/12.2 R |
| 1,954,592 | 4/1934 | Klingel | 174/174 X |
| 2,024,415 | 12/1935 | Allen, Jr. . | |
| 2,383,031 | 8/1945 | Wilson | 30/34.05 |
| 2,672,594 | 3/1954 | Morton . | |
| 2,725,588 | 12/1955 | Dennler | 191/12.2 R X |
| 2,913,791 | 11/1959 | Martin | 439/451 X |
| 3,102,922 | 9/1963 | Lashmutt | 191/12 R |
| 3,141,359 | 7/1964 | Bennett et al. | 174/50 |
| 3,407,377 | 10/1968 | Anderson . | |
| 3,419,670 | 12/1968 | Schneider . | |
| 3,691,407 | 9/1972 | Klett et al. | 310/50 X |
| 3,826,935 | 7/1974 | Grierson et al. . | |
| 3,922,055 | 11/1975 | McGregor . | |
| 3,961,833 | 6/1976 | Schmitz . | |
| 3,967,050 | 6/1976 | Makihara et al. . | |
| 4,062,430 | 12/1977 | Momberg | 191/12 R |
| 4,077,085 | 3/1978 | Yuda . | |
| 4,081,659 | 3/1978 | Kemp . | |
| 4,101,729 | 7/1978 | Balchunas . | |
| 4,133,971 | 1/1979 | Boyd et al. | 439/452 X |
| 4,162,561 | 7/1979 | Tillemans . | |
| 4,365,141 | 12/1982 | Weiss | 392/385 |
| 4,585,194 | 4/1986 | Schwob | 248/52 |
| 4,667,460 | 5/1987 | Kramer . | |
| 4,712,972 | 12/1987 | Nakashima et al. | 414/744.2 X |
| 4,733,433 | 3/1988 | Simm et al. | 15/410 |
| 4,858,271 | 8/1989 | Berfield et al. | 439/501 X |
| 4,875,879 | 10/1989 | Bunyea et al. | 439/501 |
| 4,910,362 | 3/1990 | Kinner | 174/135 |
| 5,164,546 | 11/1992 | Kumagai . | |

*Primary Examiner*—Michael S. Huppert
*Assistant Examiner*—Scott L. Lowe
*Attorney, Agent, or Firm*—Marshall, O'Toole, Gerstein, Murray & Borun

[57] ABSTRACT

A retainer for a portion of an electric power cord includes a guide that guides the cord into a space between a pair of ears that cooperate with a grooved part of a handle to define two V notch passageways for the cord leading the cord into a groove which wraps around the handle. The floor of the guide defines with the groove a path for the cord past the ears which is substantially in a plane.

14 Claims, 3 Drawing Sheets

CORD RETAINER FOR ELECTRIC POWER CORD

RELATED APPLICATIONS

This application is a Continuation-In-Part of application Ser. No. 07/865,996 Filed Apr. 9, 1992, now abandoned.

BACKGROUND OF THE INVENTION

1. Field of the Invention

The present invention relates to a power cord retainer for the handle of a portable electric appliance.

2. Description of the Related Art

Numerous methods of retaining all or a portion of an electrical power cord attached to an electrical appliance are known. U.S. Pat. No. 4,733,433 to Simm et al. teaches an insert member for a grip unit of a suction hose of a vacuum cleaner which includes a cord retaining groove where the cord leaves the groove and then projects out between two ears which are in the plane of the groove. U.S. Pat. No. 670,552 to Brown teaches a handle for electric lights which includes a groove in which an electric cord is wound. The cord passes out of the plane of the groove through an opening in the handle. U.S. Pat. No. 741,154 to Meyer teaches a cord retainer with a slot along the handle. U.S. Pat. No. 4,875,879 to Bunyea et al. teaches a cord retainer for an electric trimmer. A cord passes through a cavity in a handle of the trimmer and a spring retains the cord in the cavity.

Other patents are relevant and the following is a non-exhaustive list of patents teaching retainer devices for electrical power cords:

| U.S. Pat. No. | Inventor | Date |
|---|---|---|
| 627,215 | Stewart | 06/20/1899 |
| 1,643,656 | Hasselton | 09/27/27 |
| 2,383,031 | Wilson | 08/21/45 |
| 3,141,359 | Bennett et al. | 07/21/64 |
| 4,365,141 | Weiss | 12/21/82 |
| 4,585,194 | Schwob | 04/29/86 |
| 4,712,972 | Nakashima et al. | 12/15/87 |
| 4,910,3621 | Kinner | 03/20/90 |
| Des. 254,565 | Brown | 03/25/80 |
| Des. 298,673 | Slany et al. | 11/22/88 |

SUMMARY OF THE INVENTION

It is an object of the present invention to provide a novel retainer for releasably securing a portion of an electrical power cord to a handle of an electric appliance in a simple and easy manner.

This and other objects are achieved by the electrical power cord retainer of the invention which is located on a handle, such as the handle of an electric appliance. The retainer includes a guide located on the handle which guides the cord into and out of the retainer. The guide has a floor over which the cord is guided. A pair of ears stand up from the floor and the cord passes between them. A part of the handle is spaced a short distance from the ears for defining notches between the ears and the handle part through which the cord passes out from between the ears. The cord then wraps around the handle part. A groove extends partially circumferentially around the handle part to releasably secure the cord. The floor of the guide is generally flat and the groove in the handle part is so oriented that the guide and the groove in the handle part hold the cord in a single plane as the cord passes over the guide, between the ears, out through the notches, and around and through the groove in the handle. The positions of the guide and its floor, the ears and the groove in the handle part, plus the shape and radius of the groove, the bends in the path of the cord and the thickness and stiffness of the cord cooperate to effectively fix the cord in the retainer essentially in one plane. There need be no additional means for fixing the cord in the retainer beside the shape of the retainer.

The retainer may be located at the end of the handle of an electric appliance, preferably attached to a grip on the handle. The pair of ears may extend out of an end of the handle and the guide may extend from the lower edge up across the length direction of the handle. The grooved handle part is also preferably located at an end of the handle and above the guide. The handle part includes the groove toward its upward side and includes a lower wall facing toward the ears and located on the side of the handle part opposite the groove. The groove in the handle part may wrap substantially about 180° around a center axis of the handle. The lower wall of the handle part cooperates with the up facing front wall of each ear to define notches between the lower wall and the ears, which are preferably V-shaped when viewed from the side of the handle, through which notches the cord passes from between the ears around to the handle part.

The handle part may be a part molded on the handle or a strain relief connected to the handle and encircling a power cord of the appliance.

Other objects and features of the invention will become apparent from the following description and accompanying drawings.

DETAILED DESCRIPTION OF THE PREFERRED EMBODIMENTS

The drawings show a handle of an electric appliance, preferably a hand held, portable electric appliance, including a retainer 10 according to the invention. The portable appliance may be, for example, a grass trimmer, a hedge trimmer, or a vacuum cleaner. The electric appliance includes a pistol grip type handle including a grip 11, formed integrally with the retainer 10, and a trigger actuator 12 for a switch. The remainder of the appliance may be conventional and is not shown.

Figure 1:
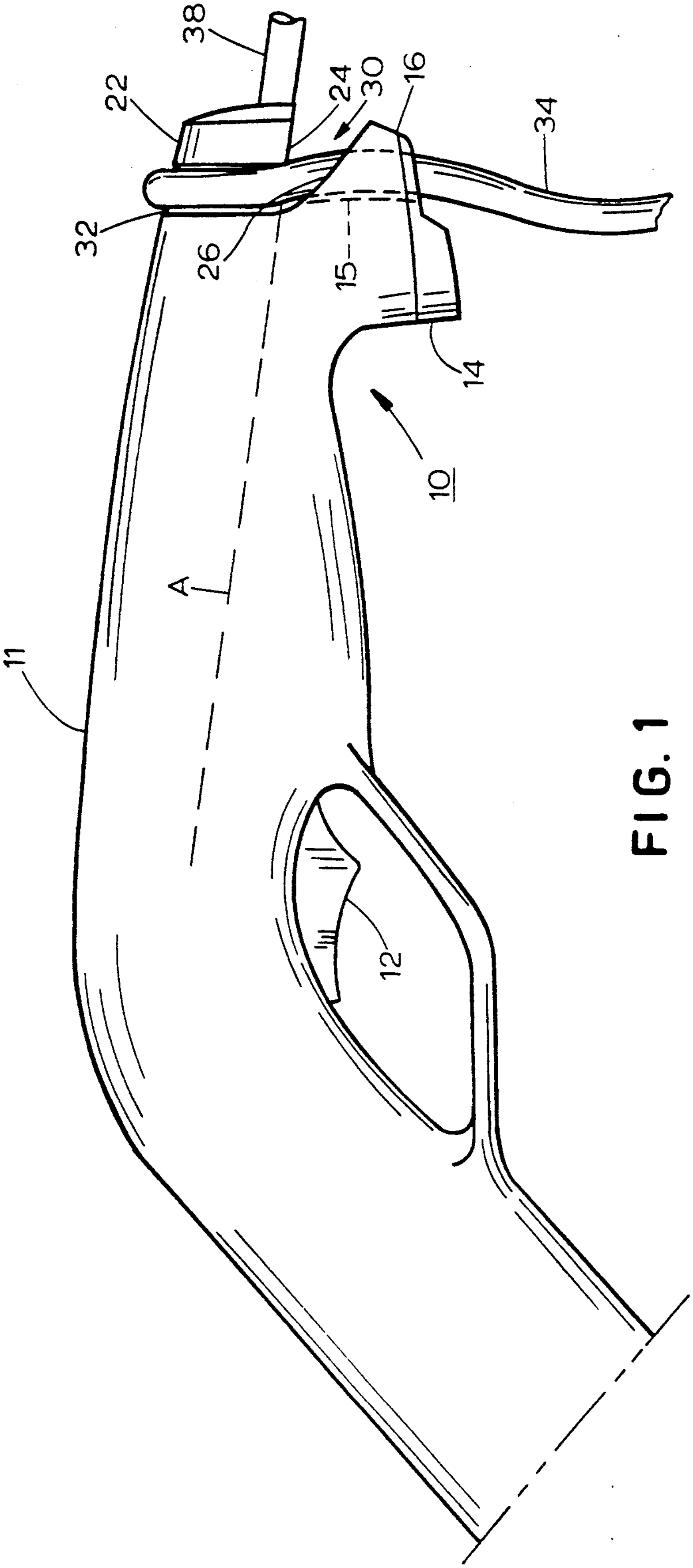
FIG. 1 is a side view of part of a handle of an electric appliance including an embodiment of a retainer for an electrical power cord in accordance with the invention.

The retainer 10 includes a guide 14 projecting below the underside of the grip 11. The guide includes a downwardly projecting lower edge 13 which is an entrance for the power cord to a flat floor 15 of the guide, and the floor leads to the below described notches 30. The guide floor 15 is generally vertical when the handle is in the normal operating position shown in FIG. 1, although that orientation is not required, and the orientation varies as the handle is tilted. The guide 14 extends across the direction of elongation of the handle. Extending above and rearwardly of the grip 11 and of the floor 15 and located past the entrance edge 13 are a pair of ears 16, 18 at the sides of the floor 15, which are separated to define a space 20 at the floor into which a power cord 34 is guided by the guide 14. Located vertically above and spaced from the ears 16, 18 along the guide is a grooved handle part 22 that extends rearwardly out of the free end of the grip 11. The handle part 22 extends approximately 180° around the upper side of a center axis A of the grip 11 and terminates at a lower wall 24 which faces toward the ears 16, 18. The upper walls 26 and 28 of the ears 16 and 18, respectively, face toward and are spaced from the wall 24, and the walls 26, 28 cooperate with the lower wall 24 of the handle part 22 to define two generally V-shaped notches 30, when viewing the handle from the side as shown in FIG. 1, for passage of the power cord 34, as described below. The handle part 22 includes a groove 32 around its periphery and extending to its lower wall 24, and in which the power cord may be disposed.

Figure 2:
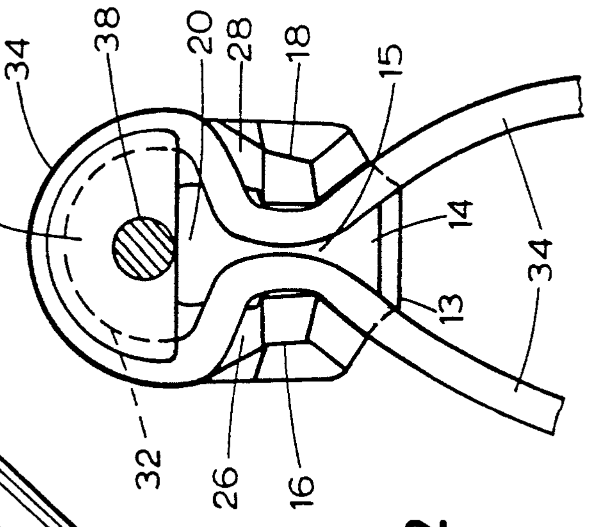
FIG. 2 is an end view of a portion of the handle with retainer.

The path of the power cord 34 through the retainer 10 is shown in FIG. 2. The rearwardly facing floor of the guide 14 supports the power cord in the plane of the floor 15 and guides the power cord into the space 20 between the ears 16, 18. The power cord then passes through one V-shaped notch 30 defined by the front wall 26 of the ear 16 and the lower wall 24 of the handle part 22, loops around the groove 32 in the grooved handle part 22, then back into space 20 through the other V-shaped notch 30 defined by the front wall 28 of the ear 18 and the lower wall 24 of the handle part 22. The guide entrance edge 13, the guide floor 15 and the groove 32 are oriented and positioned to keep the power cord generally in one plane and to prevent the cord from bending out of that plane, as occurs with the prior art.

Figure 4:
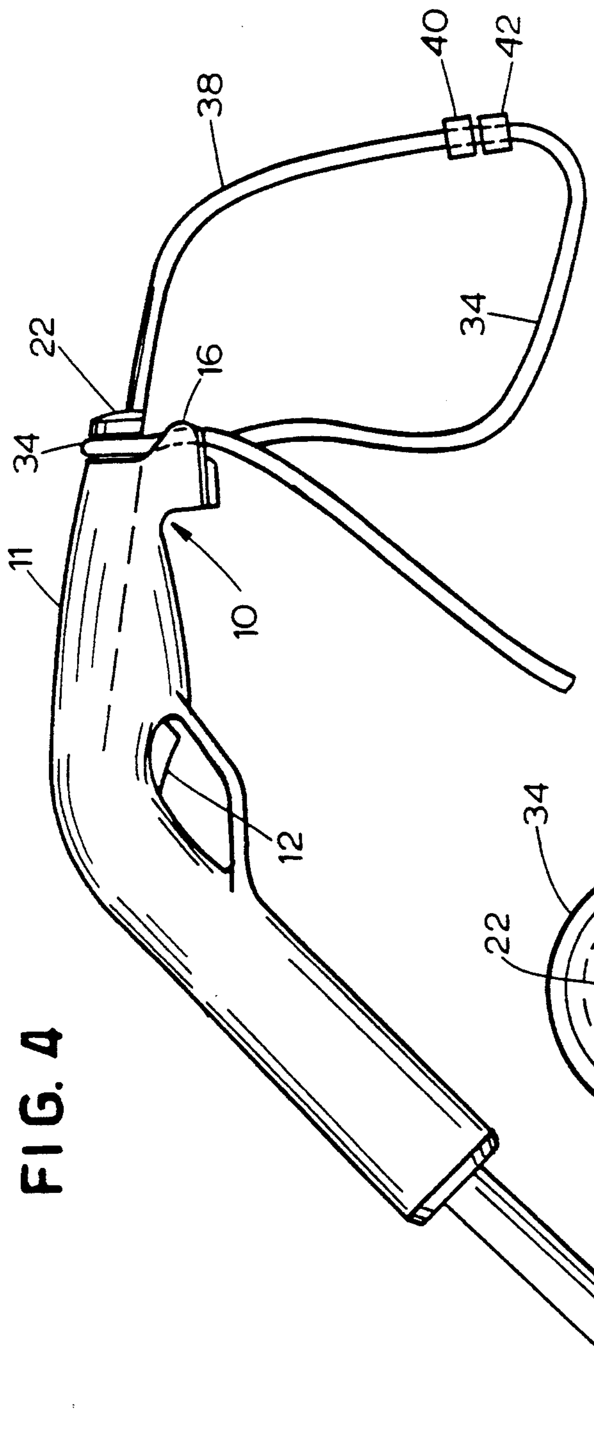
FIG. 4 is a side view of a portion of an electric appliance showing a portion of a power cord secured within a retainer device and connected to a conduit extending out of the appliance.
Figure 3:
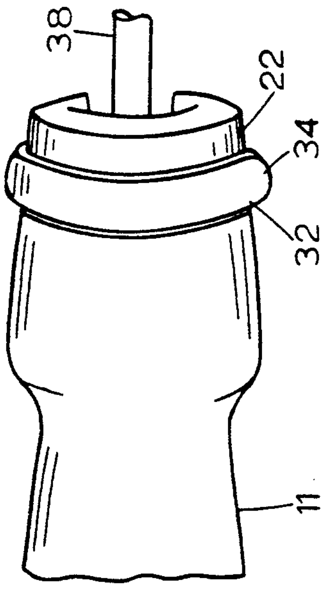
FIG. 3 is a top view of the handle and retainer.

The retainer 10 is especially useful in connecting electrical appliances as shown in FIG. 4. The handle 11 of the appliance includes a short length of electrical cord 38 extending rearwardly from the end thereof and terminating in a male plug 40 for connection to a female plug 42 of a power extension cord 34 that in turn is connected to a power source such as an electrical wall outlet (not shown). In this type of appliance, the plug 40 can unintentionally become disconnected from the plug 42 due to the user exceeding the length of power cord 34. In the present invention, however, the user is less likely to disconnect the cord 38 from the power cord 34 because when the power cord 34 is fully extended, a portion of the power cord 34 is fixed in the retainer 10, as described above and the user does not pull against the easily detachable connection of the plugs 40 and 42. Furthermore, the entire retainer tends to hold the cord 38 against undesired sharp bending.

Figure 5:
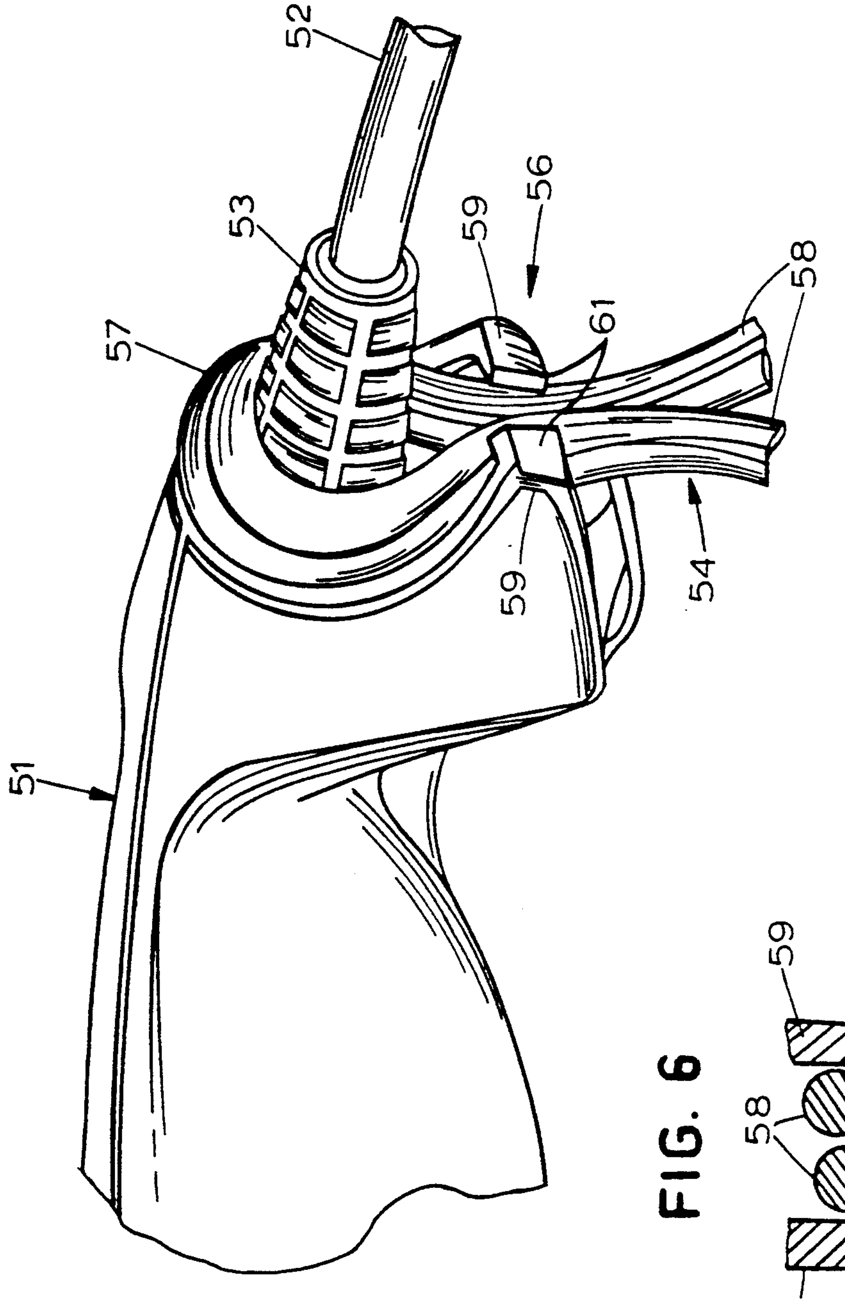
FIG. 5 is a perspective view of an alternative embodiment of the invention.

FIG. 5 illustrates a cord retainer for an appliance generally similar to that shown in FIGS. 1 to 4. The appliance includes a handle grip 51 and a power cord 52 extending from the rearward end of the grip. The cord 52 enters the grip 51 through a cord hole (not illustrated) in a conventional manner, and a strain relief grommet or sleeve 53 extends around a short length of the cord 52. The sleeve 53 extends through or into the cord hole and is clamped by the handle grip 51, and the sleeve 53 prevents undesirable sharp bends of the cord 52 adjacent the grip 51.

The cord 52 terminates in a plug connector (not illustrated) similar to the plug 40 which is coupled to a plug attached to an extension cord 54.

Figure 6:
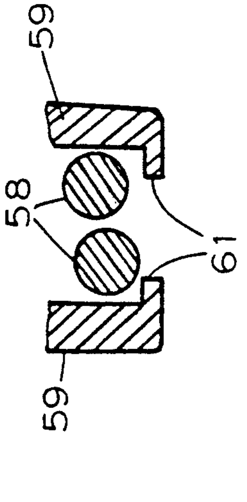
FIG. 6 shows a fragment of the structure illustrated in FIG. 5.

The handle grip 51 includes a cord retainer 56 which is similar to the retainer 10 except that the retainer 56 does not include the grooved handle part 22. The cord 54 is bent to form a loop 57 which is positioned around the upper and vertical sides of the strain relief sleeve 53. The downwardly extending portions 58 of the cord 54 are pinched together and placed between two ears 59 which are similar to the ears 16, 18. It will therefore be apparent that the sleeve 53 serves the function of the part 22 with the exception that the sleeve 53 does not include a retainer groove like the groove 32. At the rearward ends of the ears 59 are provided lobes 61 (FIG. 6) which extend toward each other and partially close the opening between the ears 59, thus restraining the cord in the opening. The ears 16, 18 of the embodiment shown in FIGS. 1 to 4 are preferably also provided with lobes similar to the lobes 61.

In both embodiments of the invention, the cord is bent or folded to form a loop around a part of the handle, and the two ends of the loop are pinched together between two ears. The inherent stiffness of the cord tends to straighten out the loop, and this tendency causes the pinched ends of the loop to tightly engage the ears and be held thereby.

Although the present invention has been described in connection with embodiments thereof, other modifications and variations may be apparent to those skilled in the art. The present invention should be limited not by the specific disclosure herein, but only by the appended claims.

What is claimed is:

1. A retainer for releasably securing a portion of an electric power supply cord to a handle, said handle being elongated and having a direction of extension, comprising:

a guide attached to and projecting across said direction of extension of the handle for guiding the portion of the cord into the retainer, the guide having a floor placed generally for holding the portion of the cord in a single plane as the portion of the cord extends past the guide and through the retainer;

a pair of upstanding ears extending out of and above the floor of the guide and the ears being spaced apart for defining a space therebetween for guiding said portion of the cord in the space and for retaining the portion of the cord at the floor of the guide;

the handle having a handle part, and a partially circumferential groove formed in the handle part for the power cord to be releasably securable within the groove; the groove being oriented to hold the cord generally in the plane of the floor of the guide; the handle part being spaced away from the ears to define notches between the handle part and the ears through which the cord may pass to wrap around the handle part and in the groove; and the ears and the groove in the handle part, as well as the shape and radius of the groove and spacing of the notches relative to the cord's diameter all cooperating to fix the cord in the retainer device.

2. The retainer of claim 1, wherein the guide has an entrance edge past which the cord enters the guide and the ears are spaced a distance along the floor from the entrance edge of the guide.

3. The retainer of claim 1, wherein said retainer is integral with the handle and is located at an end of the handle.

4. The retainer of claim 1, wherein the retainer is oriented so that the guide extends downwardly at the underside of the handle and the handle part is above the guide.

5. The retainer device of claim 4, wherein the pair of ears extend longitudinally out of an end of the handle.

6. The retainer of claim 1, wherein the groove of the handle part wraps around the side of the handle part facing away from the ears and the guide.

7. The retainer of claim 6, wherein the handle part has a lower wall facing toward the ears and the lower wall is located on a side of the handle part not including the groove.

8. The retainer of claim 6, wherein the groove wraps substantially 180° around a center axis of the handle and partially around the handle part.

9. The retainer of claim 6, wherein each ear includes a front wall which faces the lower wall of the handle part, each front wall and the lower wall of the handle part together defining one of said notches for passage of said portion of said cord over the guide, between the ears, along the notch and around and through the groove in the handle part.

10. The retainer device of claim 9, wherein each notch is generally V-shaped, narrowing toward the floor of the guide.

11. A cord retainer for an electrical appliance having a handle and a power cord extending through said handle, said power cord being used with an extension cord, said cord retainer comprising projection means extending from a portion of the handle, said projection means being exposed exteriorly of said handle and said power cord extending through said projection means to the exterior of said handle, two ears extending outwardly from the exterior of said handle adjacent said projection means, said ears being spaced apart, said ears forming a cord space therebetween which leads to said projection means, whereby said extension cord may be looped around said projection means and around said power cord and pinched between said ears.

12. A cord retainer as set forth in claim 11, wherein said projection means comprises a handle part.

13. A cord retainer as set forth in claim 11, wherein said appliance includes a power cord and said projection means comprises a strain relief sleeve positioned around said power cord.

14. A cord retainer as set forth in claim 11, and further including lobes formed on said ears and extending partially across said cord space.

* * * * *